(12) United States Patent
Chen et al.

(10) Patent No.: US 9,939,612 B2
(45) Date of Patent: Apr. 10, 2018

(54) WIDE-ANGLE LENS

(71) Applicants: AO Ether Optronics (Shenzhen) Limited, Shenzhen, Guandong Province (CN); AO Ether Corporation, Taichung (TW)

(72) Inventors: Bo-Yan Chen, Taichung (TW); Hsi-Ling Chang, Taichung (TW)

(73) Assignees: AO ETHER OPTRONICS (SHENZHEN) LIMITED, Shenzhen, Guangdong Province (CN); AO ETHER CORPORATION, Taichung (TW)

( * ) Notice: Subject to any disclaimer, the term of this patent is extended or adjusted under 35 U.S.C. 154(b) by 154 days.

(21) Appl. No.: 15/206,530

(22) Filed: Jul. 11, 2016

(65) Prior Publication Data

US 2017/0038559 A1   Feb. 9, 2017

(30) Foreign Application Priority Data

Aug. 6, 2015 (CN) .......................... 2015 1 0478627

(51) Int. Cl.
*G02B 13/00* (2006.01)
*G02B 13/04* (2006.01)
*G02B 9/12* (2006.01)

(52) U.S. Cl.
CPC ........... *G02B 13/0035* (2013.01); *G02B 9/12* (2013.01); *G02B 13/04* (2013.01)

(58) Field of Classification Search
CPC ...... G02B 13/0035; G02B 13/04; G02B 9/12; G02B 13/004; G02B 13/0045; G02B 13/0055; G02B 9/34; G02B 9/58; G02B 9/60; G02B 9/62; G02B 9/64
See application file for complete search history.

(56) References Cited

U.S. PATENT DOCUMENTS

| 2008/0080065 | A1* | 4/2008 | Asami | G02B 9/12 359/716 |
| 2015/0248050 | A1* | 9/2015 | Nakamura | G03B 17/565 359/675 |
| 2017/0168264 | A1* | 6/2017 | Chen | G02B 9/60 |
| 2017/0168268 | A1* | 6/2017 | Tang | G02B 13/0045 |

\* cited by examiner

*Primary Examiner* — Jordan Schwartz
(74) *Attorney, Agent, or Firm* — McClure, Qualey & Rodack, LLP

(57) ABSTRACT

A wide-angle lens comprises sequentially from an object side to an image side along an optical axis a first lens, a second lens, a stop and a third lens. The first lens is a biconcave lens and with negative refractive power. The second lens is a convex-concave lens with positive refractive power and includes a convex surface facing the object side and concave surface facing the image side. The third lens is with positive refractive power and includes a convex surface facing the image side. The wide-angle lens satisfies the following condition: $2.9<D_{L1}D_{L2}<3.1$ wherein $D_{L1}$ is an effective diameter of the first lens and $D_{L2}$ is an effective diameter of the second lens.

18 Claims, 8 Drawing Sheets

WIDE-ANGLE LENS

BACKGROUND OF THE INVENTION

Field of the Invention

The invention relates to a wide-angle lens.

Description of the Related Art

Digital camera and cell phone have been continuously developed toward high pixel and weight reduction. Therefore, the requirements for wide-angle lens with high pixel and miniaturization are greatly increased. The well-known lens assembly with three lenses usually uses one lens with low Abbe number which is close to the image side, two lenses with high Abbe number and an aperture before the first lens in order to meet the requirements of miniaturization and high resolution. However, the field of view of well-known lens assembly is relatively small. When the temperature reaches 60° C. or the length between the object and the lens assembly is equal to 300 mm, the resolution of the lens assembly will become worse. Therefore, a lens assembly needs a new structure in order to enhance the characteristics described above and meet the requirement of the present.

BRIEF SUMMARY OF THE INVENTION

The invention provides a wide-angle lens can further shorten total lens length to solve the above problem. The wide-angle lens of the invention, provided with characteristics of a shortened total lens length, an increased field of view, still has a good optical performance and can meet a requirement of resolution when the temperature reaches 60° C. or the length between the object and the wide-angle lens is equal to 300 mm.

The wide-angle lens in accordance with an exemplary embodiment of the invention comprises sequentially from an object side to an image side along an optical axis: a first lens which is a biconcave lens with negative refractive power; a second lens which is a meniscus lens with positive refractive power and includes a convex surface facing the object side and a concave surface facing the image side;and a third lens with positive refractive power and including a convex surface facing the image side. The wide-angle lens satisfies the following condition: $2.9 < D_{L1}/D_{L2} < 3.1$ wherein $D_{L1}$ is an effective diameter of the first lens and $D_{L2}$ is an effective diameter of the second lens. The object-side surface of the first lens is shaped in such a manner as to be a concave surface on an optical axis of the first lens and to decrease in negative power of the object-side surface as a position on the object-side surface goes away from the optical axis.

In another exemplary embodiment, the third lens includes a convex surface facing the object side.

In yet another exemplary embodiment, the first lens is shaped in such a manner as to have two curvature inflection points within the effective diameter of the first lens.

In another exemplary embodiment, the Abbe number of the first lens is larger than the Abbe number of the second lens and the Abbe number of the third lens is larger than the Abbe number of the second lens In yet another exemplary embodiment, the wide-angle lens satisfies 1.48 mm<TLT<1.50 nm, wherein TLT is the total lens thickness of all lens elements with refractive power of the wide-angle lens along the optical axis.

In another exemplary embodiment, the wide-angle lens satisfies $Vd_1>40$, $Vd_2<40$, $Vd_3>40$, wherein $Vd_1$ is an Abbe number of the first lens, $Vd_2$ is an Abbe number of the second lens and $Vd_3$ is an Abbe number of the third lens.

In yet another exemplary embodiment, the first lens, the second lens and the third lens satisfies $3 < < f/f_2 + f/f_3 - f/f_1 < 7$, wherein f is an effective focal length of the wide-angle lens, $f_1$ is an effective focal length of the first lens, $f_2$ is an effective focal length of the second lens and $f_3$ is an effective focal length of the third lens.

In another exemplary embodiment, the second lens and the third lens satisfies $2 < Vd_3 - Vd_2 < 74$, wherein $Vd_2$ is an Abbe number of the second lens and $Vd_3$ is an Abbe number of the third lens.

In yet another exemplary embodiment, the third lens is made of glass material.

In another exemplary embodiment, the first lens is made of plastic material and the second lens is made of plastic material.

In yet another exemplary embodiment, the first lens comprises two surfaces, at least one of which is an aspheric surface or both of which are aspheric surfaces; the second lens comprises two surfaces, at least one of which is an aspheric surface or both of which are aspheric surfaces; and the third lens comprises two surfaces, at least one of which is an aspheric surface or both of which are aspheric surfaces.

In another exemplary embodiment, the wide-angle lens satisfies 3.27 mm<TTL<3.28 mm , wherein TTL denotes the total track lengthof the wide-angle lens.

In yet another exemplary embodiment, the wide-angle lens further comprises a stop disposed between the second lens and the third lens.

In still another exemplary embodiment of the invention, the wide-angle lens comprises sequentially from an object side to an image side along an optical axis: a first lens with negative refractive power; a second lens with positive refractive power; and a third lens with positive refractive power. The wide-angle lens satisfies the following condition: $2.9 < D_{L1}/D_{L2} < 3.1$ , $Vd_1>40$, $Vd_2<40$, $Vd_3>40$, $-3 < f/f_2 + f/f_3 + f/f_1 < 7$, wherein $D_{L1}$ is an effective diameter of the first lens , $D_{L2}$ is an effective diameter of the second lens, $Vd_1$ is an Abbe number of the first lens, $Vd_2$ is an Abbe number of the second lens , $Vd_3$ is an Abbe number of the third lens, f is an effective focal length of the wide-angle lens , $f_1$ is an effective focal length of the first lens, $f_2$ is an effective focal length of the second lens and $f_3$ is an effective focal length of the third lens. The object-side surface of the first lens is shaped in such a manner as to be a concave surface on an optical axis of the first lens and to decrease in negative power of the object-side surface as a position on the object-side surface goes away from the optical axis.

In another exemplary embodiment, the wide-angle lens satisfies 3.27 mm<TTI<3.28 mm, wherein TTL denotes the total track length of the wide-angle lens.

In yet another exemplary embodiment, the wide-angle lens satisfies 1.48 mm<TLT<1.50 mm, wherein TLT is the total lens thickness of all lens elements with refractive power of the wide-angle lens along the optical axis.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
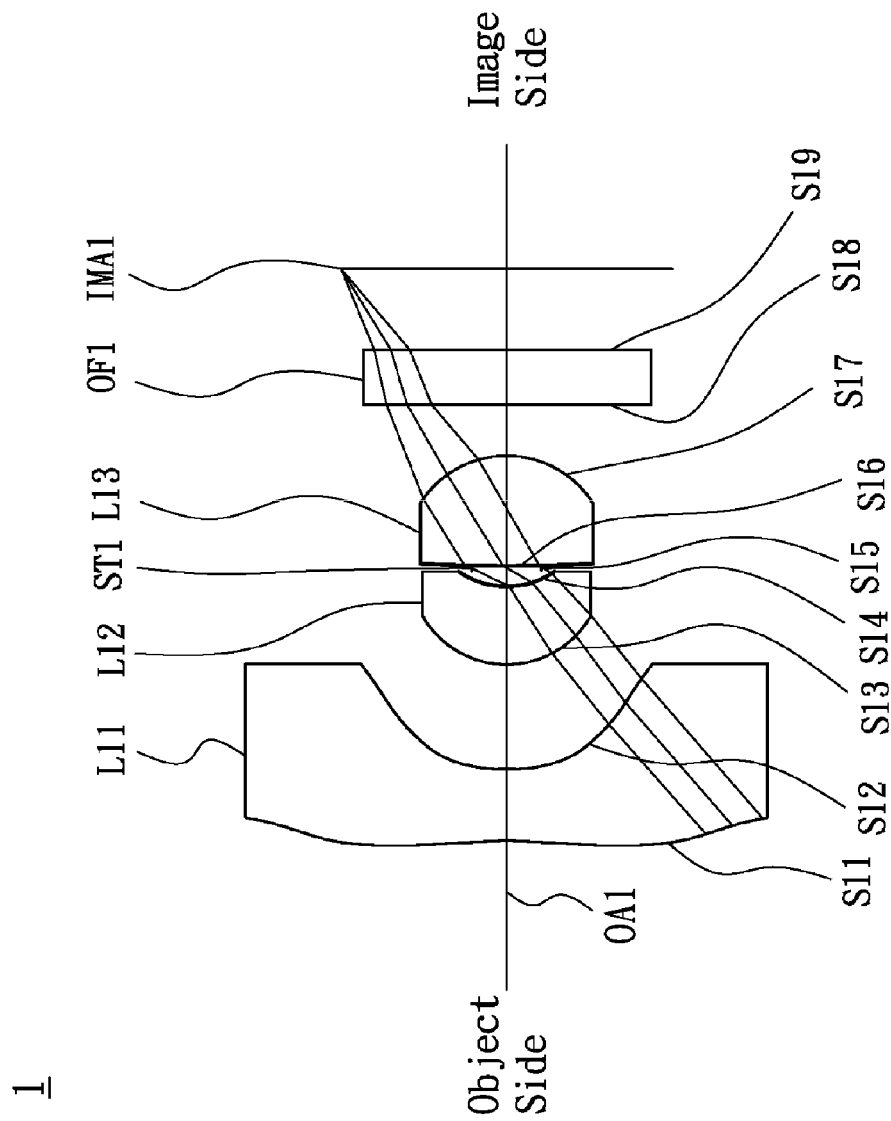
FIG. 1 is a lens layout and optical path diagram of a wide-angle lens in accordance with a first embodiment of the invention.

Referring to FIG. 1, FIG. 1 is a lens layout and optical path diagram of a wide-angle lens in accordance with a first embodiment of the invention. The wide-angle lens 1 includes a first lens L11, a second lens L12, a stop ST1, a third lens L13 and an optical filter OF1, all of which are arranged in sequence from an object side to an image side along an optical axis OA1. In operation, an image of light rays from the object side is formed on an image plane IMA1. The first lens L11 is made of plastic material and with negative refractive power, wherein the object side surface S11 is a concave surface, the image side surface S12 is a concave surface and both of the object side surface S11 and image side surface S12 are aspheric surfaces. The object side surface S11 is shaped in such a manner as to have two curvature inflection points within the effective diameter of the first lens L11. The second lens L12 is made of plastic material and with positive refractive power, wherein the object side surface S13 is a convex surface, the image side surface S14 is a concave surface and both of the object side surface S13 and image side surface S14 are aspheric surfaces. The third lens L13 is made of glass material and with positive refractive power, wherein the object side surface S16 is a convex surface, the image side surface S17 is a convex surface and both of the object side surface S16 and image side surface S17 are aspheric surfaces. Both of the object side surface S18 and image side surface S19 of the optical filter OF1 are plane surfaces. In the first embodiment, the Abbe number of the first lens L11 is larger than the Abbe number of the second lens L12. And the Abbe number of the third lens L13 is larger than the Abbe number of the second lens L12.

In order to maintain excellent optical performance of the wide-angle lens in accordance with the first embodiment of the invention, the wide-angle lens 1 must satisfies the following eight conditions:

$$2.9 < D1_{L11}/D1_{L12} < 3.1 \quad (1)$$

$$1.48 \text{ mm} < TLT1.50 \text{ nm} \quad (2)$$

$$Vd1_1 > 40 \quad (3)$$

$$Vd1_2 < 40 \quad (4)$$

$$Vd1_3 > 40 \quad (5)$$

$$-3 < f1/f1_2 + f1/f1_3 - f1/f1_1 < 7 \quad (6)$$

$$2 < Vd1_3 - Vd1_2 < 74 \quad (7)$$

$$3.27 \text{ mm} < TTL1 < 3.28 \text{ mm} \quad (8)$$

wherein $D1_{L11}$ is an effective diameter of the first lens L11, $D1_{L12}$ is an effective diameter of the second lens L12, $D1_{L11}$ is the straight length from one of the edge of the first lens L11 through the center of the first lens L11 to the other edge of the first lens L11, $D1_{L12}$ is the straight length from one of the edge of the second lens L12 through the center of the second lens L12 to the other edge of the second lens L12, TLT1 is the total lens thickness of all lens elements with refractive power of the wide-angle lens 1 along the optical axis OA', $Vd1_1$ is an Abbe number of the first lens L11, $Vd1_2$ is an Abbe number of the second lens L12, $Vd1_3$ is an Abbe number of the third lens L13, f1 is an effective focal length of the wide-angle lens 1, $f1_1$ is an effective focal length of the first lens L11, $f1_2$ is an effective focal length of the second lens L12 and $f1_3$ is an effective focal length of the third lens L13, TTL1 denotes the total track length of the wide-angle lens 1.

By the above design of the lenses and stop ST1, the wide-angle lens 1 is provided with a shortened total lens length, an increased field of view, an effective corrected aberration and the resolution of the wide-angle lens also can meet the requirement of optical performance when the temperature reaches 60° C.

In order to achieve the above purposes and effectively enhance the optical performance, the wide-angle lens 1 in accordance with the first embodiment of the invention is provided with the optical specifications shown in Table 1, which include the effective focal length, F-number, total lens length, field of view, the effective diameter of the first lens L11, the effective diameter of the second lens L12, the ambient operating temperature, radius of curvature of each lens surface, thickness between adjacent surface, refractive index of each lens and Abbe number of each lens. Table 1 shows that the effective focal length is equal to 0.8074 mm, F-number is equal to 2.2, total lens length is equal to 3.26 mm, field of view is equal to 120°, the effective diameter of the first lens L11 is equal to 1.53 mm, the effective diameter of the second lens L12 is equal to 0.52 mm, the ambient operating temperature is equal to 60° C. and the length between the object 1 and the wide-angle lens 1 is equal to 2000 mm for the wide-angle lens 1 of the first embodiment of the invention.

TABLE 1

Effective Focal Length = 0.8074 mm F-number = 2.2
Total Lens Length = 3.26 mm Field of View = 120°
Effective diameter of the first lens L11 = 1.53 mm
Effective diameter of the second lens L12 = 0.52 mm
Ambient operating temperature = 60° C.

| Surface Number | Radius of Curvature (mm) | Thickness (mm) | Nd | Vd | Remark |
|---|---|---|---|---|---|
| O1 | ∞ | 2000 | | | Object 1 (The figure is not shown) |
| S11 | −3.3535 | 0.4088 | 1.535 | 55.71 | The First Lens L11 |
| S12 | 0.8673 | 0.602 | | | |
| S13 | 0.558 | 0.45 | 1.635 | 23.9 | The Second Lens L12 |

TABLE 1-continued

Effective Focal Length = 0.8074 mm F-number = 2.2
Total Lens Length = 3.26 mm Field of View = 120°
Effective diameter of the first lens L11 = 1.53 mm
Effective diameter of the second lens L12 = 0.52 mm
Ambient operating temperature = 60° C.

| Surface Number | Radius of Curvature (mm) | Thickness (mm) | Nd | Vd | Remark |
|---|---|---|---|---|---|
| S14 | 0.685 | 0.0993 | | | |
| S15 | ∞ | 0.0132 | | | Stop ST1 |
| S16 | 5.136 | 0.6292 | 1.606 | 57.54 | The Third Lens L13 |
| S17 | −0.541 | 0.3 | | | |
| S18 | ∞ | 0.3 | | | Optical Filter OF1 |
| S19 | ∞ | 0.4718 | | | |

The aspheric surface sag z of each lens in table 1 can be calculated by the following formula:

$$z = ch^2 / \{1 + [1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each surface are shown in Table 2.

TABLE 2

| Surface Number | k<br>D | A<br>E | B<br>F | C<br>G |
|---|---|---|---|---|
| S11 | 0<br>0.002706293 | 0.23772108<br>0.000873388 | −0.096070154<br>−1.34E−03 | 0.012560174<br>2.73E−04 |
| S12 | 0<br>−3.8021284 | 0.00904725<br>−4.0260112 | 0.013611326<br>8.59E−02 | 3.1878189<br>4.44E+00 |
| S13 | 0<br>−98.132526 | −0.78779729<br>330.24069 | 5.9709126<br>1.32E+03 | −14.464596<br>−5.58E+03 |
| S14 | 0<br>−3446.6468 | 2.9514857<br>4421.5035 | −45.646288<br>−1.89E+05 | 960.12193<br>−1.27E+06 |
| S16 | 0<br>7626.3227 | −0.22966246<br>−13840.301 | 1.2421789<br>−1.47E+06 | −224.43636<br>1.15E+07 |
| S17 | 0<br>−12.470552 | 0.62072135<br>−332.12523 | −2.4839809<br>7.99E+02 | 24.103603<br>1.31E+03 |

For wide-angle lens 1 of the first embodiment, the effective diameter $D1_{L11}$ of the first lens L11 is equal to 1.53 mm, the effective diameter $D1_{L12}$ of the second lens L12 is equal to 0.52 mm, the total lens thickness of all three lens elements of the wide-angle lens 1 along the optical axis OA1 is equal to 1.488 mm, the total track length of the wide-angle lens 1 is equal to 3.274 mm, the Abbe number $Vd1_1$ of the first lens L11 is equal to 55.71, the Abbe number $Vd1_2$ of the second lens L12 is equal to 23.9, the Abbe number $Vd1_3$ of the third lens L13 is equal to 57.54, the effective focal length f1 of the wide-angle lens 1 is equal to 0.8074 mm, the effective focal length $f1_1$ of the first lens L11 is equal to 1.0781 mm, the effective focal length $f1_2$ of the second lens L12 is equal to 1.9537 mm and the effective focal length $f1_3$ of the third lens L13 is equal to 0.889495 mm. According to the above data, the following values can be obtained:

$D1_{L11}/D1_{L12} = 2.94$

TLT1 = 1.488 mm $Vd1_1 = 55.71$ $Vd1_2 = 23.9$ $Vd1_3 = 57.54$ $f1/f1_2 + f1/f1_3 - f1/f1_1 = 2.0698$ $Vd1_3 - Vd1_2 = 33.64$

TTL1 = 3.274 mm which respectively satisfy the above conditions (1)-(8).

Figure 2A:
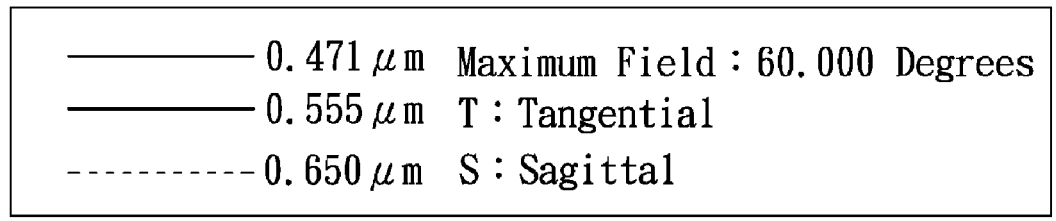
FIG. 2A is an astigmatic field curves diagram of the wide-angle lens in accordance with the first embodiment of the invention.
Figure 2A:
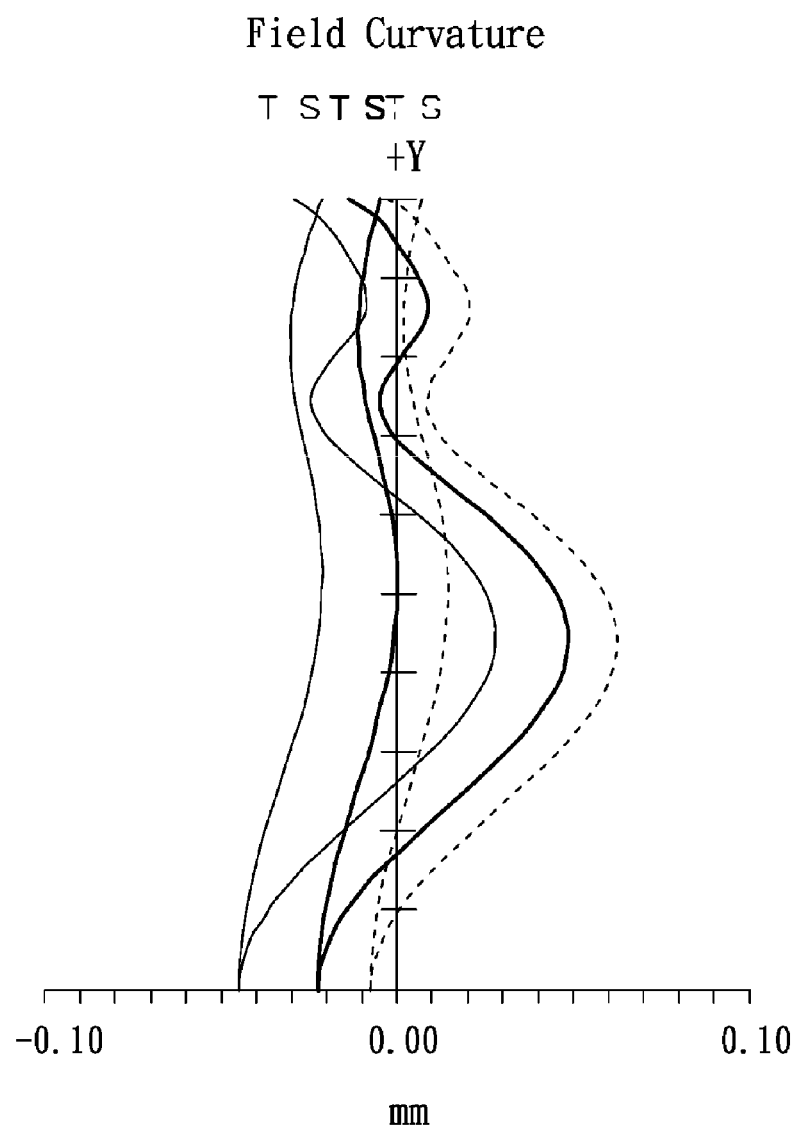
Figure 2B:
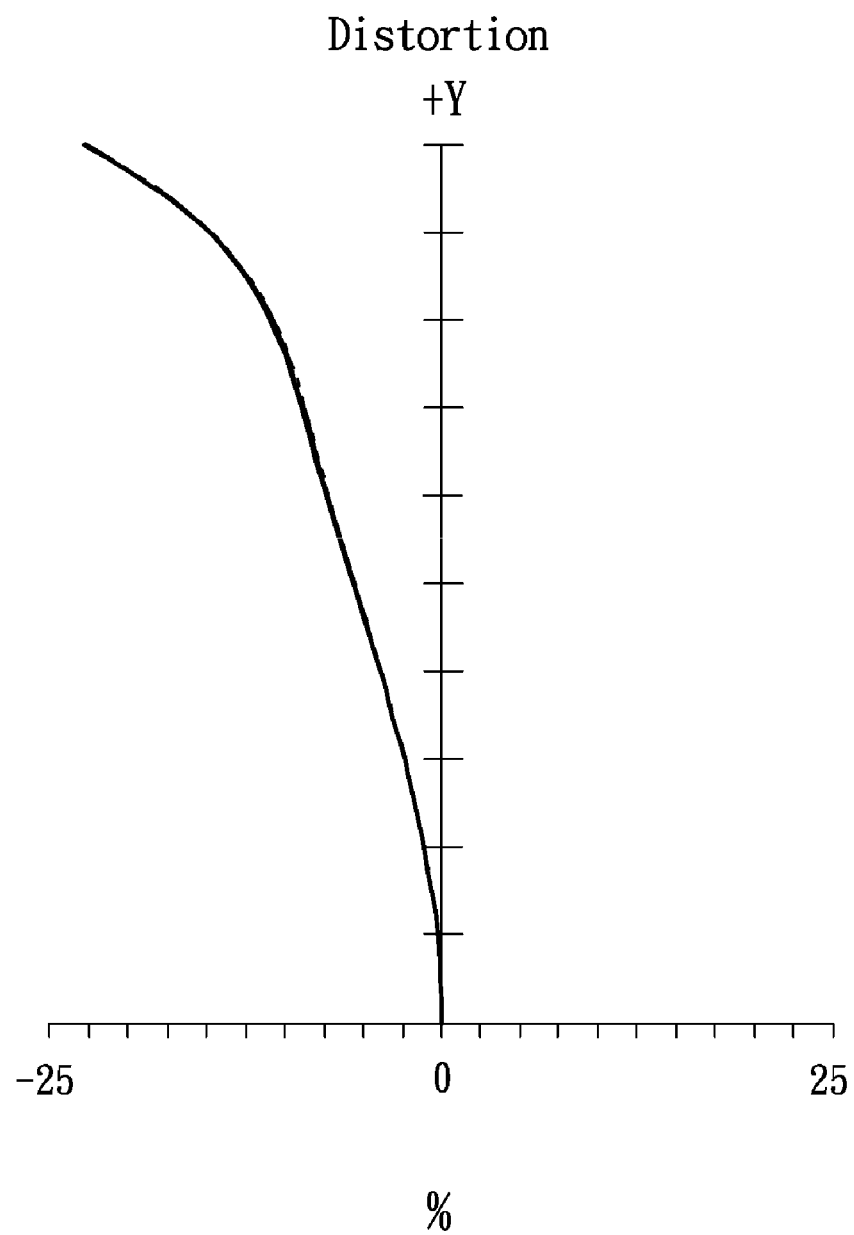
FIG. 2B is a distortion diagram of the wide-angle lens in accordance with the first embodiment of the invention.
Figure 2C:
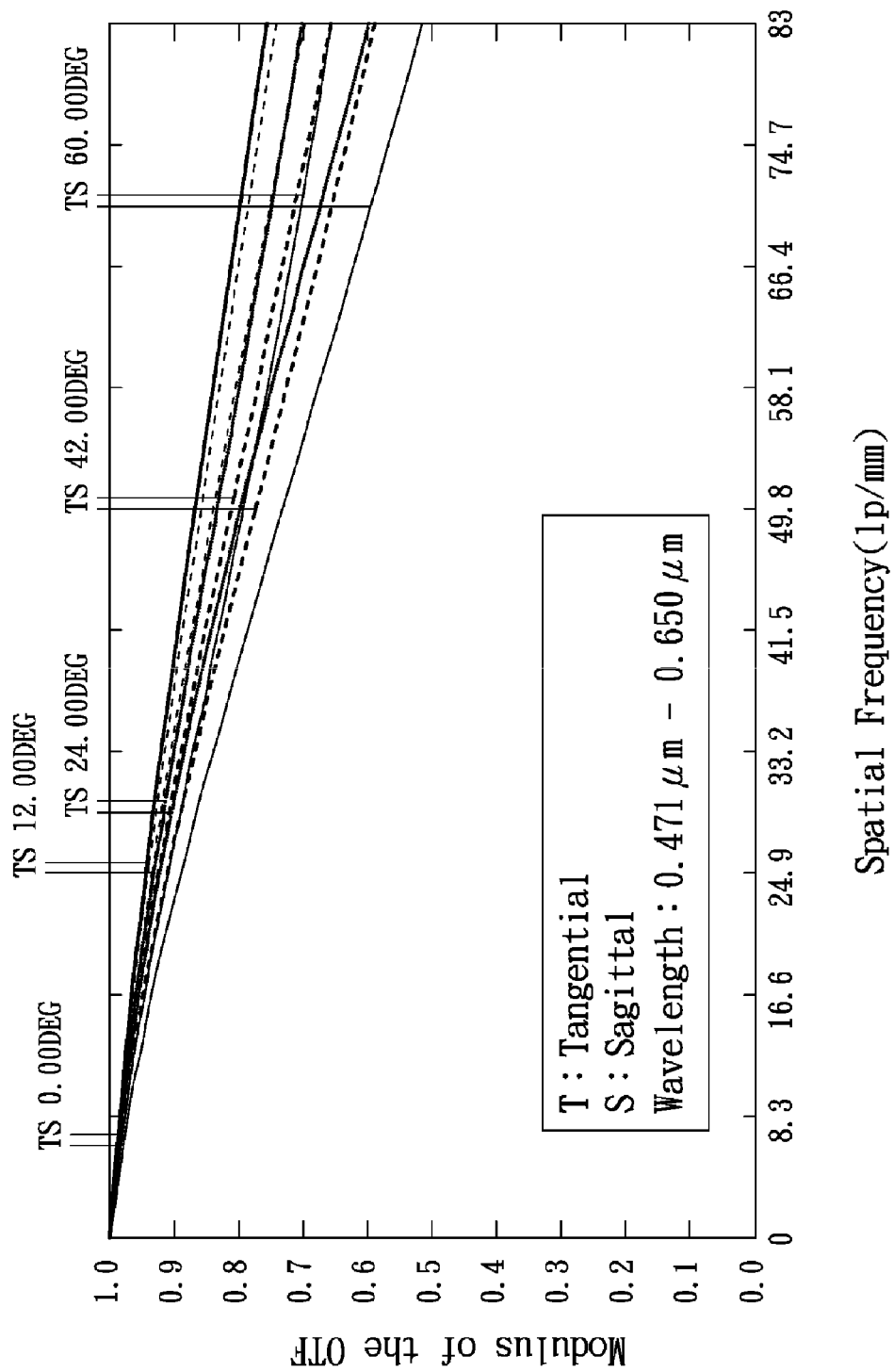
FIG. 2C is a modulation transfer function diagram of the wide-angle lens in accordance with the first embodiment of the invention.

By the above arrangements of the lenses and stop ST1, the wide-angle lens 1 of the first embodiment can meet the requirements of optical performance as seen in FIGS. 2A-2C, wherein FIG. 2A shows an astigmatic field curves diagram of the wide-angle lens 1 in accordance with the first embodiment of the invention, FIG. 2B shows a distortion diagram of the wide-angle lens 1 in accordance with the first embodiment of the invention and FIG. 2C shows a modulation transfer function diagram of the wide-angle lens 1 in accordance with the first embodiment of the invention.

It can be seen from FIG. 2A that the astigmatic field curves of tangential direction and sagittal direction in the wide-angle lens 1 of the first embodiment ranges between 0.05 mm and 0.07 mm for the wavelength of 471.0000 nm, 555.0000 nm and 650.0000 nm. It can be seen from FIG. 2B that the distortion in the wide-angle lens 1 of the first embodiment ranges between −23% and 0% for the wavelength of 471.0000 nm, 555.0000 nm and 650.0000 nm. It can be seen from FIG. 2C that the modulation transfer function of tangential direction and sagittal direction in the wide-angle lens 1 of the first embodiment ranges between 0.51 and 1.0 wherein the wavelength ranges between 0.471 μm and 0.650 μm, each field is 0.000 degree, 12.00 degrees, 24.00 degrees, 42.00 degrees and 60.00 degrees, spatial frequency ranges between 0 lp/mm and 83 lp/mm. It is obvious that the astigmatic field curves and the distortion of the wide-angle lens 1 of the first embodiment can be corrected effectively. The wide-angle lens 1 also can meet the requirement of resolution when the temperature reaches 60° C. Therefore, the wide-angle lens 1 of the first embodiment is capable of good optical performance.

Figure 3:
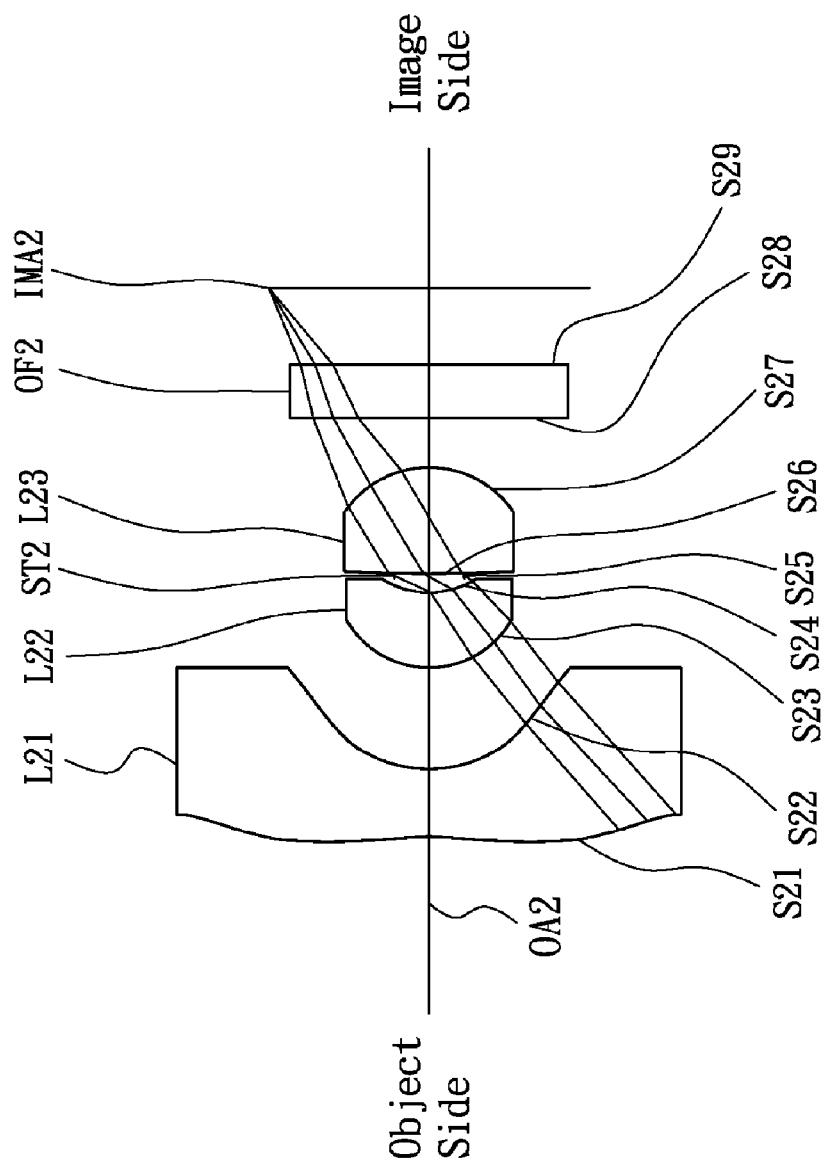
FIG. 3 is a lens layout and optical path diagram of a wide-angle lens in accordance with a second embodiment of the invention.

Referring to FIG. 3, FIG. 3 is a lens layout and optical path diagram of a wide-angle lens in accordance with a second embodiment of the invention. The wide-angle lens 2 includes a first lens L21, a second lens L22, a stop ST2, a third lens L23 and an optical filter OF2, all of which are arranged in sequence from an object side to an image side along an optical axis OA2. In operation, an image of light rays from the object side is formed on an image plane IMA2. The first lens L21 is made of plastic material and with negative refractive power, wherein the object side surface S21 is a concave surface, the image side surface S22 is a concave surface and both of the object side surface S21 and image side surface S22 are aspheric surfaces. The object side surface S21 is shaped in such a manner as to have two curvature inflection points within the effective diameter of the first lens L21. The second lens L22 is made of plastic material and with positive refractive power, wherein the object side surface S23 is a convex surface, the image side surface S24 is a concave surface and both of the object side surface S23 and image side surface S24 are aspheric surfaces. The third lens L23 is made of glass material and with positive refractive power, wherein the object side surface S26 isconvex surface, the image side surface S27 is a convex surface and both of the oct side surface S26 and image side surface S27 are aspheric surfaces. Both of the object side surface S28 and image side surface S29 of the opticallter OF2 are plane surfaces. In the second embodiment, the Abbe number of the first lens L21 is larger than the Abbe number of the second lens L22. And the Abbe number of the third lens L23 is larger than the Abbe number of the second lens L22.

In order to maintain excellent optical performance of the wide-angle lens in accordance with the second embodiment of the invention, the wide-angle lens 2 must satisfies the following eight conditions:

$$2.9 < D2_{L21}/D2_{L22} < 3.1 \quad (9)$$

$$1.48 \text{ mm} < TLT2 < 1.50 \text{ nm} \quad (10)$$

$$Vd2_1 > 40 \quad (11)$$

$$Vd2_2 < 40 \quad (12)$$

$$Vd2_3 > 40 \quad (13)$$

$$-3 < f2/f2_2 + f2/f2_3 - f2/f2_1 < 7 \quad (14)$$

$$2 < Vd2_3 - Vd2_2 < 74 \quad (15)$$

$$3.27 \text{ mm} < TTL2 < 3.28 \text{ mm} \quad (16)$$

wherein $D2_{L21}$ is an effective diameter of the first lens L21, $D2_{L22}$ is an effective diameter of the second lens L22, $D2_{L21}$ is the straight length from one of the edge of the first lens L21 through the center of the first lens L21 to the other edge of the first lens L21, $D2_{L22}$ is the straight length from one of the edge of the second lens L22 through the center of the second lens L22 to the other edge of the second lens L22, TLT2 is the total lens thickness of all lens elements with refractive power of the wide-angle lens 2 along the optical axis OA2, $Vd2_1$ is an Abbe number of the first lens L21, $Vd2_2$ is an Abbe number of the second lens L22, $Vd2_3$ is an Abbe number of the third lens L23, f2 is an effective focal length of the wide-angle lens 2, $f2_1$ is an effective focal length of the first lens L21, $f2_2$ is an effective focal length of the second lens L22 and $f2_3$ is an effective focal length of the third lens L23, TTL2 denotes the total track length of the wide-angle lens 2.

By the above design of the lenses and stop ST2, the wide-angle lens 2 is provided with a shortened total lens length, an increased field of view, an effective corrected aberration and the resolution of the wide-angle lens also can meet the requirement when the length between the object and the wide-angle lens is equal to 300 mm.

In order to achieve the above purposes and effectively enhance the optical performance, the wide-angle lens 2 in accordance with the second embodiment of the invention is provided with the optical specifications shown in Table 3, which include the effective focal length, F-number, total lens length, field of view, the effective diameter of the first lens L21, the effective diameter of the second lens L22, the ambient operating temperature, radius of curvature of each lens surface, thickness between adjacent surface, refractive index of each lens and Abbe number of each lens. Table 3 shows that the effective focal length is equal to 0.7067 mm, F-number is equal to 2.2, total lens length is equal to 3.27 mm, field of view is equal to 120°, the effective diameter of the first lens L21 is equal to 1.5 mm, the effective diameter of the second lens L22 is equal to 0.49 mm, the ambient operating temperature is equal to 40° C. and the length between the object 2 and the wide-angle lens 2 is equal to 300 mm for the wide-angle lens 2 of the second embodiment of the invention.

TABLE 3

Effective Focal Length = 0.7067 mm F-number = 2.2
Total Lens Length = 3.27 mm Field of View = 120°
Effective diameter of the first lens L21 = 1.5 mm
Effective diameter of the second lens L22 = 0.49 mm
Ambient operating temperature = 40° C.

| Surface Number | Radius of Curvature (mm) | Thickness (mm) | Nd | Vd | Remark |
|---|---|---|---|---|---|
| O2 | ∞ | 300 | | | Object 2 (The figure is not shown) |
| S21 | −3.252404 | 0.409518 | 1.535 | 55.71 | The First Lens L21 |
| S22 | 0.8658331 | 0.6003346 | | | |
| S23 | 0.558 | 0.45 | 1.635 | 23.9 | The Second Lens L22 |
| S24 | 0.685 | 0.0962624 | | | |
| S25 | ∞ | 0.0129132 | | | Stop ST2 |
| S26 | 5.194015 | 0.6316412 | 1.606 | 80 | The Third Lens L23 |
| S27 | −0.541343 | 0.3 | | | |
| S28 | ∞ | 0.3 | | | Optical Filter OF2 |
| S29 | ∞ | 0.4704838 | | | |

The aspheric surface sag z of each lens in table 3 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the second embodiment, the conic constant k and the aspheric coefficients A, B, C, D, E, F, G of each surface are shown in Table 4.

TABLE 4

| Surface Number | k<br>D | A<br>E | B<br>F | C<br>G |
|---|---|---|---|---|
| S11 | 0<br>0.002704037 | 0.23853403<br>0.000875171 | −0.095925248<br>−1.34E−03 | 0.012629986<br>2.73E−04 |
| S12 | 0<br>−3.8131118 | 0.002987722<br>−4.043931 | 0.01329097<br>1.17E−01 | 3.1888081<br>4.48E+00 |

TABLE 4-continued

| Surface Number | k<br>D | A<br>E | B<br>F | C<br>G |
|---|---|---|---|---|
| S13 | 0<br>−98.365358 | −0.75337345<br>328.2461 | 5.7999724<br>1.33E+03 | −14.616284<br>−5.53E+03 |
| S14 | 0<br>−3294.1268 | 2.8347298<br>5420.5442 | −45.041394<br>−1.89E+05 | 959.17319<br>−1.51E+06 |
| S16 | 0<br>7624.4748 | −0.23072485<br>−13923.519 | 1.2644191<br>−1.47E+06 | −224.1887<br>1.14E+07 |
| S17 | 0<br>−12.384144 | 0.62870808<br>−331.85473 | −2.5096501<br>8.00E+02 | 24.092966<br>1.30E+03 |

For wide-angle lens 2 of the second embodiment, the effective diameter $D2_{L21}$ of the first lens L21 is equal to 1.5 mm, the effective diameter $D2_{L22}$ of the second lens L22 is equal to 0.49 mm, the total lens thickness of all three lens elements of the wide-angle lens 2 along the optical axis OA2 is equal to 1.491 mm, the total track length of the wide-angle lens 2 is equal to 3.271 mm, the Abbe number $Vd2_1$ of the first lens L21 is equal to 55.71, the Abbe number $Vd2_2$ of the second lens L22 is equal to 23.9, the Abbe number $Vd2_3$ of the third lens L23 is equal to 80, the effective focal length f2 of the wide-angle lens 2 is equal to 0.7067 mm, the effective focal length $f2_1$ of the first lens L21 is equal to 1.2239 mm, the effective focal length $f2_2$ of the second lens L22 is equal to 1.9537 mm and the effective focal length $f2_3$ of the third lens L23 is equal to 0.8384 mm. According to the above data, the following values can be obtained:

$D2_{L21}/D2_{L22}=3.06$ $TLT2=1.491$ mm $Vd2_1=55.71$ $Vd2_2=23.9$ $Vd2_3=80$ $f2/f2_2+f2/f2_3-f2/f2_1=1.782$ $Vd2_3-Vd2_2=56.1$ $TTL2=3.271$ mm which respectively satisfy the above conditions (9)-(16).

Figure 4A:
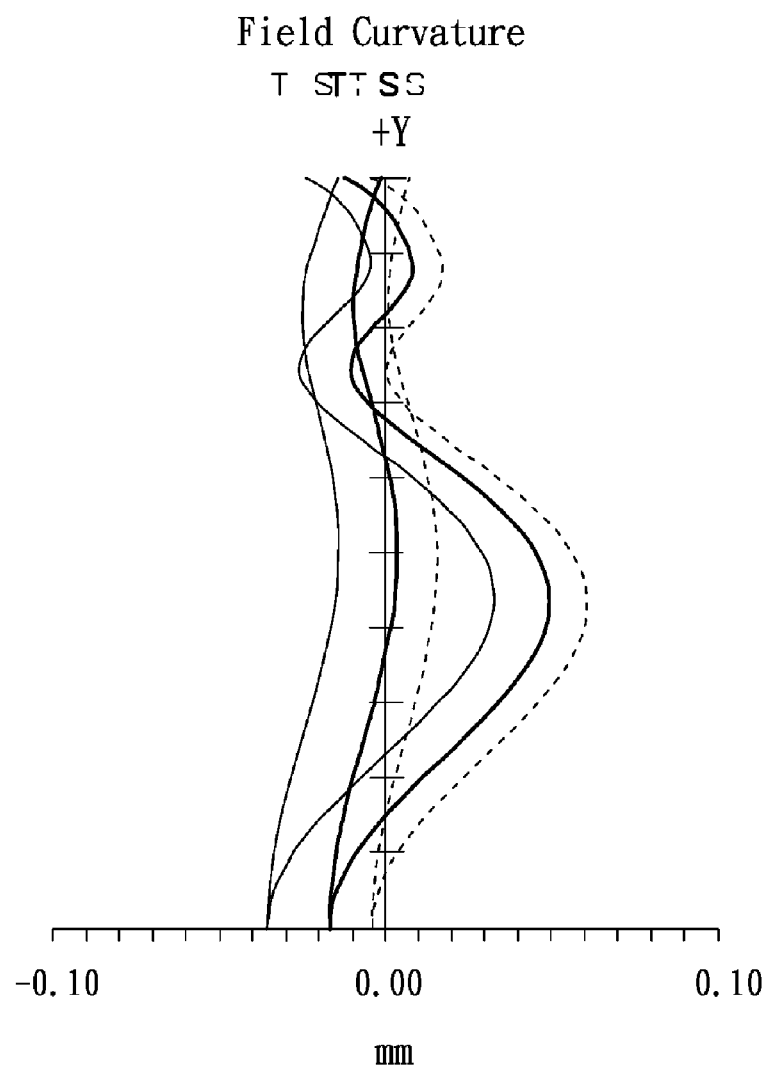
FIG. 4A is an astigmatic field curves diagram of the wide-angle lens in accordance with the second embodiment of the invention.
Figure 4B:
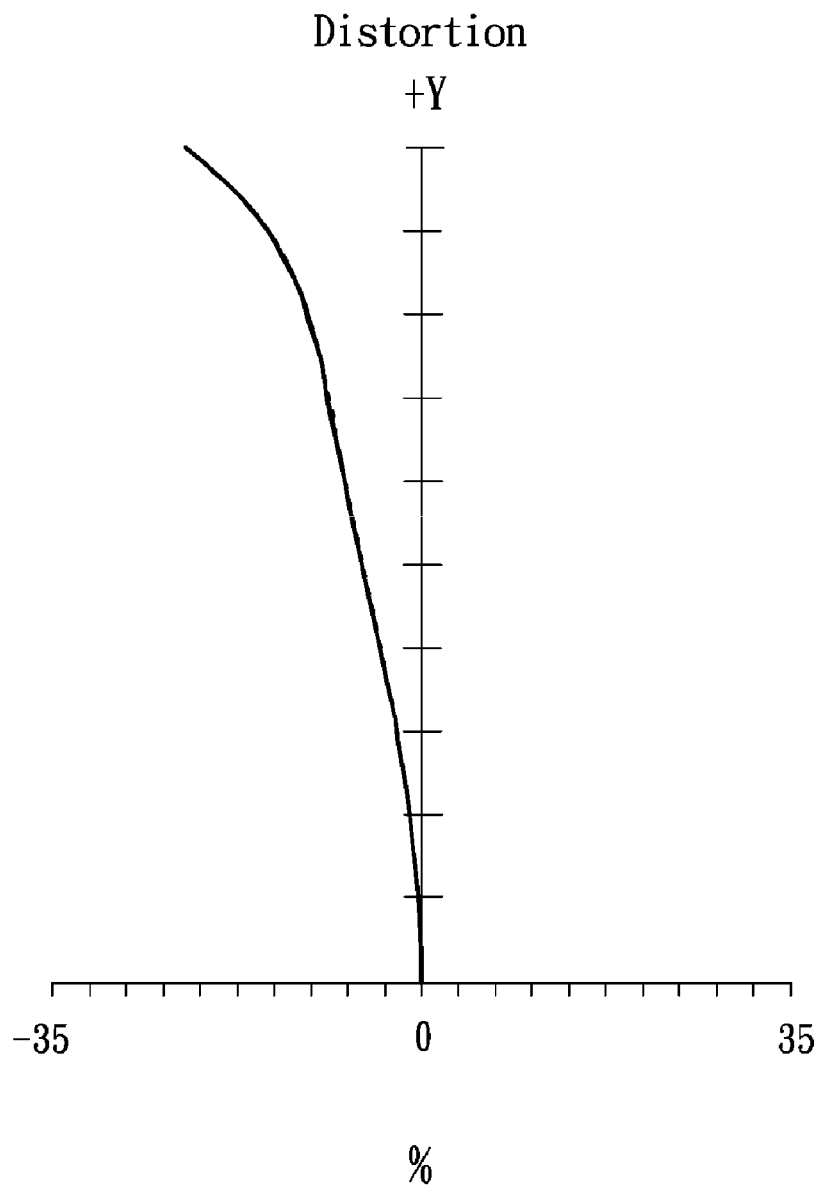
FIG. 4B is a distortion diagram of the wide-angle lens in accordance with the second embodiment of the invention.
Figure 4C:
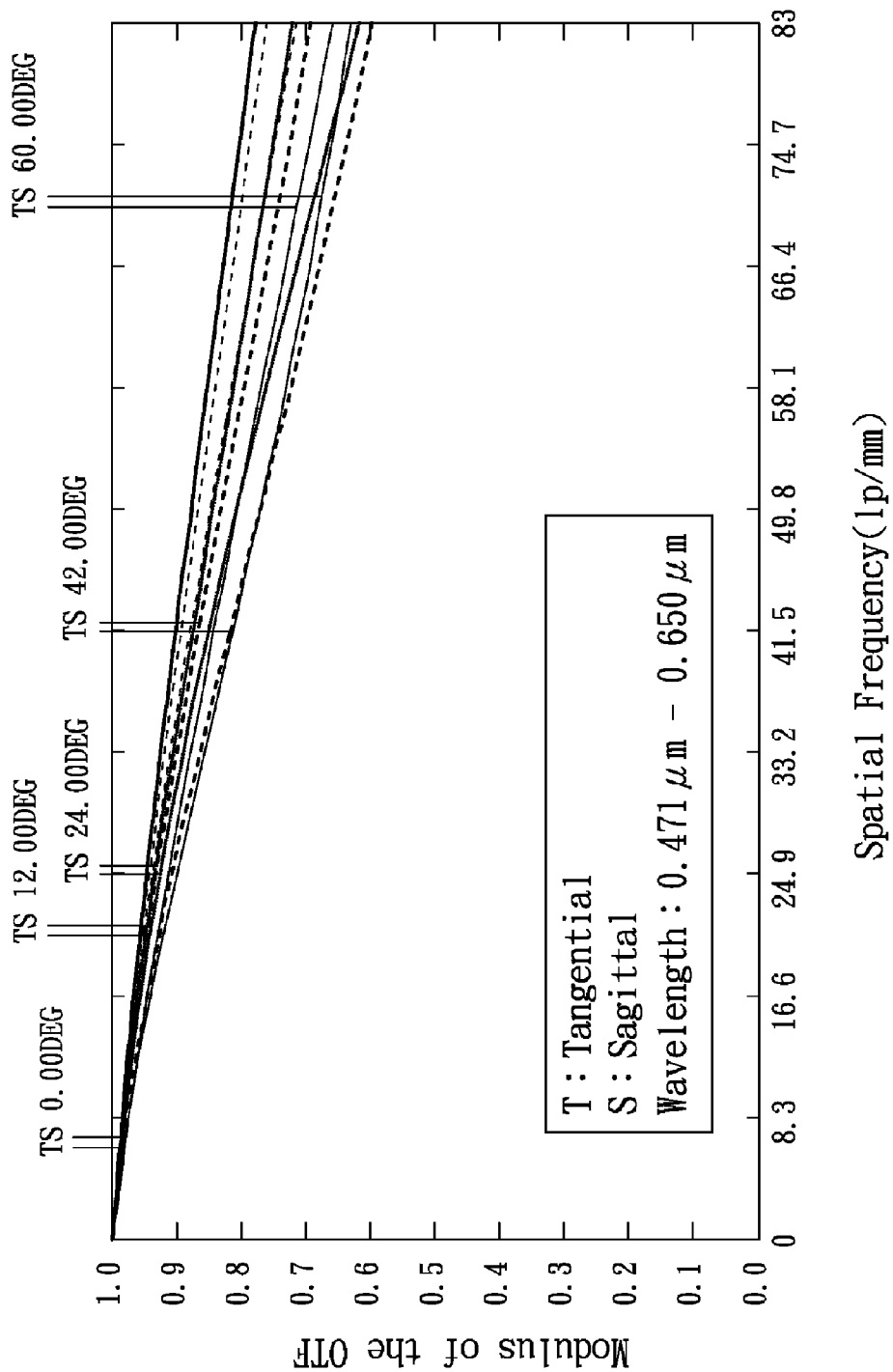
FIG. 4C is a modulation transfer function diagram of the wide-angle lens in accordance with the second embodiment of the invention.

By the above arrangements of the lenses and stop ST2, the wide-angle lens 2 of the second embodiment can meet the requirements of optical performance as seen in FIGS. 4A-4C, wherein FIG. 4A shows an astigmatic field curves diagram of the wide-angle lens 2 in accordance with the second embodiment of the invention, FIG. 4B shows a distortion diagram of the wide-angle lens 2 in accordance with the second embodiment of the invention and FIG. 4C shows a modulation transfer function diagram of the wide-angle lens 2 in accordance with the second embodiment of the invention.

It can be seen from FIG. 4A that the astigmatic field curves of tangential direction and sagittal direction in the wide-angle lens 2 of the second embodiment ranges between 0.04 mm and 0.07 mm for the wavelength of 471.0000 nm, 555.0000 nm and 650.0000 nm. It can be seen from FIG. 4B that the distortion in the wide-angle lens 2 of the second embodiment ranges between −24.5% and 0% for the wavelength of 471.0000 nm, 555.0000 nm and 650.0000 nm. It can be seen from FIG. 4C that the modulation transfer function of tangential direction and sagittal direction in the wide-angle lens 2 of the second embodiment ranges between 0.6 and 1.0 wherein the wavelength ranges between 0.471 µm and 0.650 µm, each field is 0.000 degree, 12.00 degrees, 24.00 degrees, 42.00 degrees and 60.00 degrees, spatial frequency ranges between 0 lp/mm and 83 lp/mm. It is obvious that the astigmatic field curves and the distortion of the wide-angle lens 2 of the second embodiment can be corrected effectively. And the resolution of the wide-angle lens also can meet the requirement when the length between the object 2 and the wide-angle lens 2 is equal to 300 mm. Therefore, the wide-angle lens 2 of the second embodiment is capable of good optical performance.

What is claimed is:

1. A wide-angle lens, comprising sequentially from an object side to an image side along an optical axis:
    a first lens which is a biconcave lens with negative refractive power;
    a second lens which is a meniscus lens with positive refractive power and includes a convex surface facing the object side and a concave surface facing the image side; and
    a third lens with positive refractive power and including a convex surface facing the image side;
    the wide-angle lens satisfying the following condition:

$2.9<D_{L1}/D_{L2}<3.1$ wherein $D_{L1}$ is an effective diameter of the first lens and $D_{L2}$ is an effective diameter of the second lens; and
    wherein the object-side surface of the first lens is shaped in such a manner as to be a concave surface on an optical axis of the first lens and to decrease in negative power of the object-side surface as a position on the object-side surface goes away from the optical axis.

2. The wide-angle lens as claimed in claim 1, wherein the third lens includes a convex surface facing the object side.

3. The wide-angle lens as claimed in claim 1, wherein the first lens is shaped in such a manner as to have two curvature inflection points within the effective diameter of the first lens.

4. The wide-angle lens as claimed in claim 1, wherein the Abbe number of the first lens is larger than the Abbe number of the second lens and the Abbe number of the third lens is larger than the Abbe number of the second lens.

5. The wide-angle lens as claimed in claim 1, wherein the wide-angle lens satisfies:

1.48 mm<TLT<1.50 nm wherein TLT is the total lens thickness of all lens elements with refractive power of the wide-angle lens along the optical axis.

6. The wide-angle lens as claimed in claim 1, wherein the wide-angle lens satisfies:

$Vd_1>40$, $Vd_2<40$, $Vd_3>40$ wherein $Vd_1$ is an Abbe number of the first lens, $Vd_2$ is an Abbe number of the second lens and $Vd_3$ is an Abbe number of the third lens.

7. The wide-angle lens as claimed in claim 1, wherein the first lens, the second lens and the third lens satisfies:

$$-3 < f/f_3 + f/f_3 - f/f_1 < 7$$

wherein f is an effective focal length of the wide-angle lens, $f_1$ is an effective focal length of the first lens, $f_2$ is an effective focal length of the second lens and $f_3$ is an effective focal length of the third lens.

8. The wide-angle lens as claimed in claim 1, wherein the second lens and the third lens satisfies:

$$2 < Vd_3 - Vd_2 < 74$$

wherein $Vd_2$ is an Abbe number of the second lens and $Vd_3$ is an Abbe number of the third lens.

9. The wide-angle lens as claimed in claim 1, wherein the third lens is made of glass material.

10. The wide-angle lens as claimed in claim 1, wherein the first lens is made of plastic material and the second lens is made of plastic material.

11. The wide-angle lens as claimed in claim 1, wherein the first lens comprises two surfaces, at least one of which is an aspheric surface or both of which are aspheric surfaces.

12. The wide-angle lens as claimed in claim 1, wherein the second lens comprises two surfaces, at least one of which is an aspheric surface or both of which are aspheric surfaces.

13. The wide-angle lens as claimed in claim 1, wherein the third lens comprises two surfaces, at least one of which is an aspheric surface or both of which are aspheric surfaces.

14. The wide-angle lens as claimed in claim 1, wherein the wide-angle lens satisfies:

$$3.27 \text{ mm} < TTL < 3.28 \text{ mm}$$

wherein TTL denotes the total track length of the wide-angle lens.

15. The wide-angle lens as claimed in claim 1, further comprising a stop disposed between the second lens and the third lens.

16. A wide-angle lens, comprising sequentially from an object side to an image side along an optical axis:

a first lens with negative refractive power;
a second lens with positive refractive power;
a third lens with positive refractive power;
wherein the wide-angle lens satisfies the following condition:

$$2.9 < D_{L1}/D_{L2} < 3.1$$

$$Vd_1 > 40,$$

$$Vd_2 < 40,$$

$$Vd_3 > 40$$

$$-3 < f/f_2 + f/f_3 - f/f_1 < 7$$

wherein $D_{L1}$ is an effective diameter of the first lens, $D_{L2}$ is an effective diameter of the second lens $Vd_1$ is an Abbe number of the first lens, $Vd_2$ is an Abbe number of the second lens, $Vd_3$ is an Abbe number of the third lens, f is an effective focal length of the wide-angle lens, $f_1$ is an effective focal length of the first lens, $f_2$ is an effective focal length of the second lens and $f_3$ is an effective focal length of the third lens;

wherein the object-side surface of the first lens is shaped in such a manner as to be a concave surface on an optical axis of the first lens and to decrease in negative power of the object-side surface as a position on the object-side surface goes away from the optical axis.

17. The wide-angle lens as claimed in claim 16, wherein the wide-angle lens satisfies:

$$3.27 \text{ mm} < TTL < 3.28 \text{ mm}$$

wherein TTL denotes the total track length of the wide-angle lens.

18. The wide-angle lens as claimed in claim 16, wherein the wide-angle lens satisfies:

$$1.48 \text{ mm} < TLT < 1.50 \text{ mm}$$

wherein TLT is the total lens thickness of all lens elements with refractive power of the wide-angle lens along the optical axis.

\* \* \* \* \*